United States Patent
Findlay et al.

(10) Patent No.: US 8,988,582 B2
(45) Date of Patent: Mar. 24, 2015

(54) MULTI-CHANNEL IMAGE SENSORS

(75) Inventors: Ewan Findlay, Clackmannanshire (GB); James Downing, Dunblane (GB); Andrew Murray, Haddington (GB); Lindsay Grant, Edinburgh (GB); Adam Caley, Kincardine (GB)

(73) Assignee: STMicroelectronics (Research & Development) Limited, Marlow, Buckinghamshire (GB)

( * ) Notice: Subject to any disclaimer, the term of this patent is extended or adjusted under 35 U.S.C. 154(b) by 365 days.

(21) Appl. No.: 13/368,428

(22) Filed: Feb. 8, 2012

(65) Prior Publication Data

US 2012/0206620 A1   Aug. 16, 2012

(30) Foreign Application Priority Data

Feb. 16, 2011   (GB) .................................. 1102711.7

(51) Int. Cl.
*H04N 5/225* (2006.01)
*G02B 3/00* (2006.01)

(52) U.S. Cl.
CPC ............ *H04N 5/2254* (2013.01); *G02B 3/0043* (2013.01); *G02B 3/0056* (2013.01)
USPC ........................................................ 348/340

(58) Field of Classification Search
None
See application file for complete search history.

(56) References Cited

U.S. PATENT DOCUMENTS

| | | |
|---|---|---|
| 6,137,535 A | 10/2000 | Meyers |
| 6,141,048 A | 10/2000 | Meyers |
| 6,765,617 B1 | 7/2004 | Tangen et al. |
| 7,009,652 B1 * | 3/2006 | Tanida et al. ................. 348/340 |
| 7,564,019 B2 * | 7/2009 | Olsen et al. ................. 250/208.1 |
| 8,238,738 B2 * | 8/2012 | Georgiev ....................... 396/113 |
| 2002/0162943 A1 * | 11/2002 | Lee et al. .................... 250/208.1 |
| 2005/0128335 A1 | 6/2005 | Kolehmainen et al. |
| 2005/0196068 A1 * | 9/2005 | Kawai ........................... 382/276 |
| 2008/0173793 A1 | 7/2008 | Mokhnatyuk |
| 2009/0179142 A1 | 7/2009 | Duparre et al. |
| 2010/0066812 A1 * | 3/2010 | Kajihara et al. ................. 348/46 |

FOREIGN PATENT DOCUMENTS

CN   1934872 A   3/2007

OTHER PUBLICATIONS

UK Search Report for GB1102711.7 mailed Jun. 3, 2011 (3 pages).
Chinese 1st Office Action mailed Jul. 1, 2014 for CN 201210098212.9 (9 pages).

* cited by examiner

*Primary Examiner* — Albert Cutler
(74) *Attorney, Agent, or Firm* — Gardere Wynne Sewell LLP

(57) ABSTRACT

An image sensor includes a pixel array and an image sensor objective optical element. The element is formed by a lenslet array. Each lenslet in the array directs incoming radiation onto a different specific pixel or sub-array of pixels in the pixel array. The lenslets in the array are shaped such that fields of view of next-but-one neighboring ones of the lenslets (i.e., two lenslets spaced from each other by another lenslet) do not overlap until a certain object distance away from the lenslet array.

39 Claims, 14 Drawing Sheets near field

In-focus object distance

Infinity overlap

MULTI-CHANNEL IMAGE SENSORS

PRIORITY CLAIM

This application claims priority from Great Britain Application for Patent No. 1102711.7 filed Feb. 16, 2011, the disclosure of which is hereby incorporated by reference.

TECHNICAL FIELD

The present invention relates to improvements in or relating to multi-channel image sensors and in particular to multi-channel image sensors which comprise compound imaging geometries.

BACKGROUND

Digital image sensing based upon solid state technology is well known, the two most common types of image sensors currently being charge coupled devices (CCD's) and complementary metal oxide semiconductor (CMOS) image sensors. Digital image sensors are incorporated within a wide variety of devices throughout the consumer, industrial and defense sectors among others. Typical consumer products that incorporate digital image sensors include for example digital still cameras, mobile devices such as mobile telephones, webcams, laptops and desktop computers, and video recorders.

An image sensor is a device comprising one or more radiation sensitive elements having an electrical property that changes when radiation is incident upon them, together with circuitry for converting the changed electrical property into a signal. As an example, an image sensor may comprise a photodetector that generates a charge when radiation is incident upon it. The photodetector may be designed to be sensitive to electromagnetic radiation in the range of (human) visible wavelengths, or other neighboring wavelength ranges, such as infra red or ultra violet for example. Circuitry is provided that collects and carries the charge from the radiation sensitive element for conversion to a value representing the intensity of incident radiation.

Typically, more than one radiation sensitive element will be provided in an array. The term pixel is used as a shorthand for picture element. In the context of a digital image sensor, a pixel refers to that portion of the image sensor that contributes one value representative of the radiation intensity at that point on the array. These pixel values are combined to reproduce a scene that is to be imaged by the sensor. A plurality of pixel values can be referred to collectively as image data. Pixels are usually formed on and/or within a semiconductor substrate. In fact, the radiation sensitive element comprises only a part of the pixel, and only part of the pixel's surface area (the proportion of the pixel area that the radiation sensitive element takes up is known as the fill factor). Other parts of the pixel are taken up by metallization such as transistor gates and so on. Other image sensor components, such as readout electronics, analogue to digital conversion circuitry and so on may be provided at least partially as part of each pixel, depending on the pixel architecture.

An image sensor is typically provided on or as part of an integrated circuit. The image sensor may also be provided with other components such as infra-red filters, color filter arrays and so on. It is also known to provide an image sensor with so called microlenses which are formed from optically transparent material over each individual pixel in the array, to focus light onto the light sensitive portions of the pixel, rather than onto portions which are not sensitive to light.

An image sensor system, or camera, that comprises a digital image sensor will comprise an image sensor chip (which may include microlenses formed or provided thereupon), and an optical element such as a lens or other waveguide for manipulating incident light onto the image plane of the image sensor. This optical element is known as the objective optical element, objective lens, or simply "objective".

In all application areas, there is a desire to minimize the size of the package that houses a camera. This need is particularly pressing in the field of mobile devices, where demands for increasing number of device functions and increasing complexity of functions leads to a strong desire for space saving.

In a traditional camera arrangement the physical size of the area where the objective optical element produces an image determines the focal length and thus the required height of the assembly that houses the objective optical element, called the "optical assembly" or as a shorthand simply the "optics". This height is referred to in the art as z-height—the x, y and z axes forming an orthogonal axis set and the x and y directions being in the plane of the image sensor. However, reducing the z-height in order to reduce the thickness of the camera also means reducing the sensor area and thus the sampled image resolution.

In order to achieve a reduced z-height it is known to employ a compound imaging geometry. Instead of a single objective optical element being provided which directs incident radiation on to the pixel array, two or more objectives are provided, each of which directs radiation onto a different subset of the pixel array. Each objective optical element together with the relevant subset of pixels provides a "channel" of a so called multi-channel image sensor. As an example, if the sensor area is divided into four sub areas of equal size then each sub sensor size is reduced by two. Correspondingly the focal length and thus the optical height are also reduced by a factor of two. Various compound imaging geometries have been disclosed to date, as seen for example U.S. Pat. Nos. 6,137,535; 6,141,048; and 6,765,617 and United States Patent Application Publication 2005/0128335, the disclosures of which are hereby incorporated by reference.

These solutions however suffer from parallax between channels and from color aliasing. Improvements in these areas are much desired to make a reduced z-height optical system using compound imaging geometry viable.

SUMMARY

According to a first aspect of the present disclosure there is provided an image sensor comprising: a pixel array; an image sensor objective optical element comprising a lenslet array; wherein each lenslet directs incoming radiation onto a different specific pixel or sub-array of pixels; and the shape and/or position of the lenslets in the array are such that the fields of view of next-but-one neighboring lenslets do not overlap until an application defined object distance away from the lenslet array.

The application defined object distance is the point at which the next-but-one neighboring images overlap. Therefore the application defined object distance is the minimum distance at which the object is fully sampled. Thus the desired application of the system will dictate whether the geometry of the system fully samples the object at a position in front of the lenslet array from zero to infinity distance.

Optionally, the lenslet array comprises an array of convex lenses which may preferably be formed as protuberances from a common substrate.

Optionally, the lenslet array comprises an array of wedge shaped optical elements.

Optionally, the pixel array and the lenslet array are held in a fixed relation to each other along a central optical axis of the image sensor, and the hyperfocal distance of the lenslet array corresponds to the application defined object distance.

Optionally, the pixel array and the lenslet array are movable in relation to each other along a central optical axis of the image sensor, and the application defined object distance is variable according to their relative positions.

Optionally, a region of object space at said application defined object distance that is observed by the field of view of one lenslet is also observed at said distance only by that lenslet's eight nearest neighbor lenslets.

Optionally, each lenslet comprises a wedge shaped optical element and the field of view comprises at least one face tilt of said wedge shape.

Optionally, the fields of view of the lenslets are angularly distributed across the lenslet array.

Optionally, the image sensor comprises a lenslet-level electromagnetic radiation band-sampler.

Optionally, said band-sampler comprises a band filter array formed on one side of the lenslet array.

Optionally, said band filter array samples at least two bands, with portions of different band-selectivity being arranged in a patter, optionally a square pattern, of lenslets that preferably repeats across the lenslet array.

Optionally, said band filter array samples three bands, with two of the four portions in said square pattern of lenslets being sensitive to one of the three bands and arranged diagonally opposite each other in the pattern.

Optionally, said band filter array samples four bands.

Optionally, all of the bands of electromagnetic radiation that are sampled are bands of visible light.

Optionally, at least one of the bands of electromagnetic radiation that are sampled is a band of infra-red radiation.

Optionally, the image sensor comprises a pixel-level electromagnetic radiation band-sampler.

Optionally, said electromagnetic radiation band-sampler comprises a band filter array provided over or formed on or as part of said pixel array.

Optionally, said band filter array samples at least two bands, with portions of different band-selectivity being arranged in a pattern, optionally a square pattern, of pixels that preferably repeats across the pixel array.

Optionally, said band filter array samples three bands, with two of the four portions in said square pattern of pixels being sensitive to one of the three bands and arranged diagonally opposite each other in the pattern.

Optionally, said band filter array samples four bands.

Optionally, all of the bands of electromagnetic radiation that are sampled are bands of visible light.

Optionally, at least one of the bands of electromagnetic radiation that are sampled is a band of infra-red radiation.

Optionally, the pixel-level electromagnetic radiation band-sampler comprises a first portion for a first pixel sub-array onto which a field of view of a first lenslet is focused; and a second portion for a second pixel sub-array onto which a field of view of a second lenslet is focused; said first and second portions providing different band-sampling functions.

Optionally, each of the portions of the electromagnetic radiation band-sampler comprise portions of different band-selectivity being arranged in a square pattern of pixels that preferably repeats across the pixel sub-array.

Optionally, the portions of the pixel-level electromagnetic radiation band-sampler are arranged in a square pattern of portions that preferably repeats across the pixel array.

Optionally, the image sensor comprises a processor for performing image reconstruction that dynamically determines the overlap of sub-images according to regions of interest in sub-array images determined in order to register the images with respect to each other and to stitch them into a composite image.

According to a second aspect of the present disclosure there is provided an image sensor objective optical element comprising a lenslet array, wherein the shape and/or position of the lenslets in the array are chosen such that the fields of view of next-but-one neighboring lenslets do not overlap until an application defined object distance away from the lenslet array.

Optionally, a region of object space at said predetermined distance that is observed by the field of view of one lenslet is also observed at said distance only by that lenslet's eight nearest neighbor lenslets.

Optionally, each lenslet comprises a wedge shaped optical element and the field of view comprises at least one face tilt of said wedge shape.

Optionally, the image sensor objective optical element comprises an electromagnetic radiation band-sampler.

Optionally, said band-sampler comprises a band filter array formed on one side of the lenslet array.

Optionally, wherein said band filter array samples at least three bands, with portions of different band-selectivity being arranged in a square pattern of lenslets that preferably repeats across the lenslet array.

Optionally, said band filter array samples three bands, with two of the four portions in said square pattern of lenslets being sensitive to one of the three bands and arranged diagonally opposite each other in the pattern.

Optionally, said band filter array samples four bands.

Optionally, all of the bands of electromagnetic radiation that are sampled are bands of visible light.

Optionally, at least one of the bands of electromagnetic radiation that are sampled is a band of infra-red radiation.

According to a third aspect of the present disclosure there is provided a method of imaging a scene comprising directing incident radiation from specific regions of object space onto different specific pixels or sub-arrays of pixels; wherein each specific region of object space comprises the field of view of a lenslet from within a lenslet array that forms an image sensor objective optical element, and wherein the shape and/or position of the lenslets in the array are chosen such that the fields of view of next-but-one neighboring lenslets do not overlap until an application defined object distance away from the lenslet array.

Optionally, a region of object space at said predetermined distance that is observed by the field of view of one lenslet is also observed at said distance only by that lenslet's eight nearest neighbor lenslets.

Optionally, each lenslet comprises a wedge shaped optical element and the field of view is characterised by at least one face tilt of said wedge shape.

Optionally, the method comprises carrying out lenslet-level electromagnetic radiation band sampling.

Optionally, the method comprises carrying out pixel-level electromagnetic radiation band sampling.

Optionally, said step of electromagnetic radiation band sampling comprises sampling at least two bands.

Optionally, all of the bands of electromagnetic radiation that are sampled are bands of visible light.

Optionally, at least one of the bands of electromagnetic radiation that are sampled is a band of infra-red radiation.

Optionally, the method comprises reconstructing an image by combining image data from each of the pixel sub-arrays, wherein said reconstruction dynamically determines the overlap of data from each of the pixel sub-arrays according to regions of interest in sub-array images determined in order to register the images with respect to each other and to stitch them together.

According to a fourth aspect of the present disclosure there is provided a camera comprising an image sensor comprising: a pixel array; an image sensor objective optical element comprising a lenslet array; wherein each lenslet directs incoming radiation onto a different specific pixel or sub-array of pixels; and the shape and/or position of the lenslets in the array are such that the fields of view of next-but-one neighboring lenslets do not overlap until an application defined object distance away from the lenslet array.

According to further aspects of the disclosure, there are provided a mobile telephone, webcam, optical mouse, laptop or desktop computer comprising the camera of the fourth aspect.

BRIEF DESCRIPTION OF THE DRAWINGS

The present invention will now be described, by way of example only, with reference to the accompanying drawings in which.

DETAILED DESCRIPTION OF THE DRAWINGS

The present disclosure relates to a multi-channel imaging device with an overall z-height that is reduced with respect to a similarly-specified single channel imaging device, and that improves over existing multi-channel imaging devices by addressing problems of parallax that currently cause problems in the reconstruction of images from the various sub-images from each channel.

Figure 1:
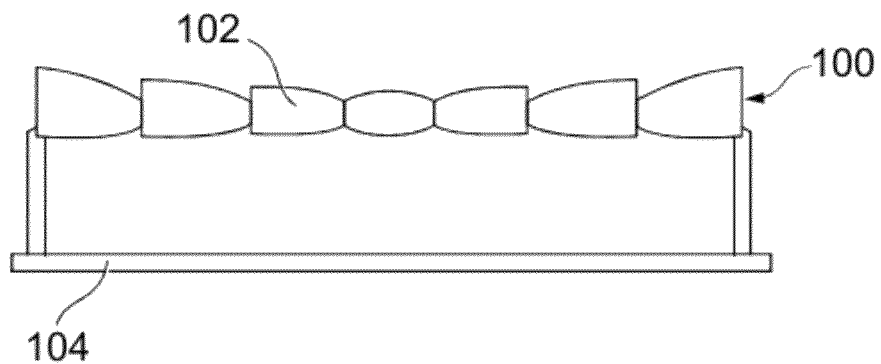
FIG. 1 shows a lenslet array for distributing the field of view across an image sensor, according to a first embodiment, in which the lenslet array is formed of specially formed wedge shaped elements.

The general principle of the disclosure is shown in FIG. 1. An objective optical element 100 comprises a lenslet array formed of individual lenslets 102.

The term "lenslet" as used in the present disclosure refers in general to any refractive optical component, provided as part of an array with other refractive optical components.

Lenslets may take various different forms. According to one embodiment the lenslets may comprise an array of miniature convex lenses, which may for example be formed using replication techniques. According to another embodiment, the lenslets may comprise specially formed wedge shaped optical elements.

The lenslets 102 shown in the example of FIG. 1 are individual wedge shaped optical elements. Each lenslet 102 is placed over a specific sub-array of pixels in an image sensor array 104. Each lenslet 102 and corresponding pixel sub-array forms a single channel. The image data gathered from each pixel sub-array can be termed a "sub-image". The various sub-images together form the overall "image" that is output by the pixel array as a whole.

The new objective optical element 100 that is provided according to this disclosure provides two optical effects. The first optical effect is to bring incident light into focus on the plane of the image sensor. The second optical effect is to divert the effective field of view seen by the pixel array according to predetermined criteria. The first and second optical effects together provide a net optical effect characteristic of the objective optical element 100 as a whole.

The net optical effect for a given channel may be provided by a single monolithic optical element, or by separate optical elements. Alternatively or in addition, the net optical effect for the entire pixel array or for portions of the pixel array may be provided by a single monolithic optical element, or by separate optical elements.

Figure 2:
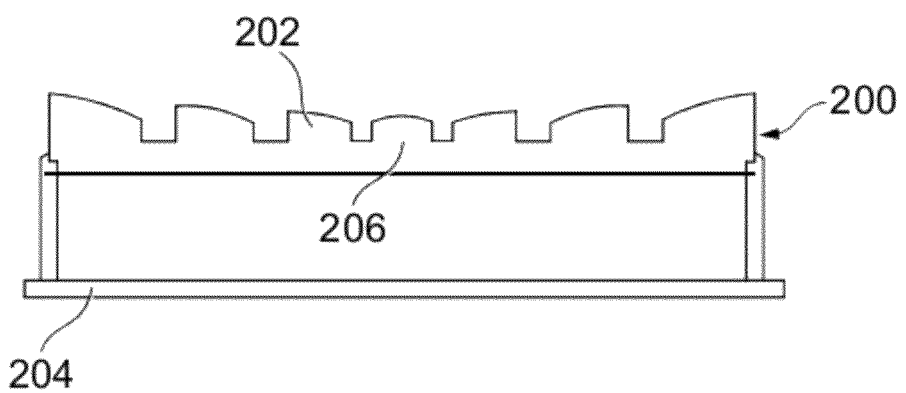
FIG. 2 shows a lenslet array for distributing the field of view across an image sensor, according to a second embodiment, in which the lenslet array comprises lenslet protuberances from a common substrate.

FIG. 2 shows an embodiment with a single monolithic objective optical element 200 which comprises a lenslet array formed of lenslets 202 which are formed as protrusions from a substrate 206. These lenslets 202 may be fabricated using wafer scale replicated lens manufacturing techniques. The substrate 206 and the lenslets 202 provide, in combination, the net optical effects of focusing incident light and diverting the effective field of view seen by the pixel array 204 according to predetermined criteria.

Figure 3:
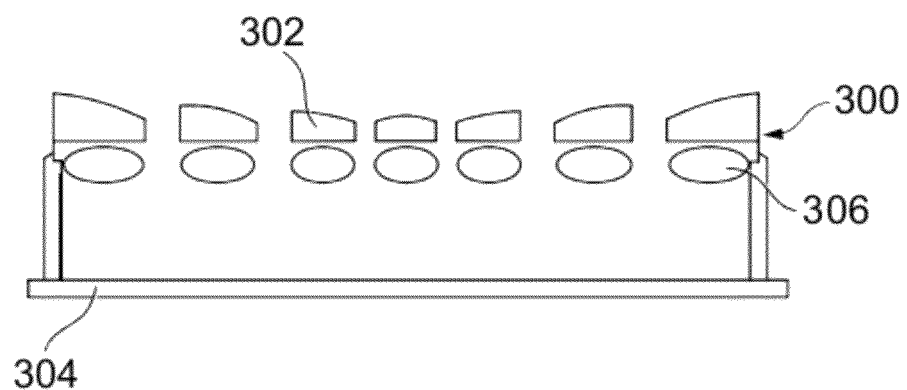
FIG. 3 shows a refractive optical component array comprising optical wedges for distributing the field of view across an image sensor, according to a third embodiment, in which the optical wedge array is provided alongside a separate array of focusing lenses.

FIG. 3 shows an embodiment wherein the net optical effect for each channel is provided by separate optical elements, namely, each channel comprises a separate optical wedge 302 and convex focusing lens 306. The focusing lenses 306 are designed to provide a first optical effect, namely, to bring incident light into focus on a focal plane at the plane of the image sensor 304. It is also possible to customize the design of each of the focusing lenses 306 to correct for channel-specific chromatic and geometrical aberrations. The optical wedges 302 are designed to provide a second optical effect, namely, to divert the effective field of view seen by the pixel array according to predetermined criteria.

Figure 4:
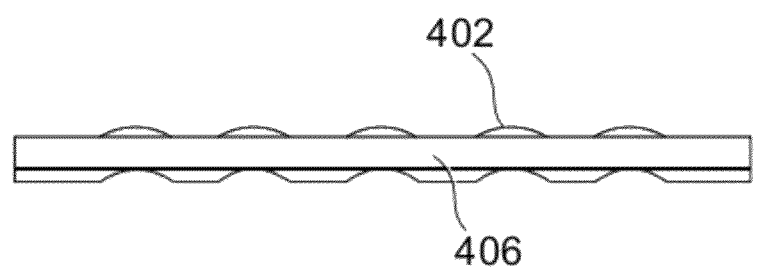
FIG. 4 shows shows an example of the formation of an array of lenslets on a substrate according to wafer scale replication techniques.

FIG. 4 shows an example of the formation of an array of lenslets 402 on a substrate 406 according to wafer scale replication techniques. This structure may for example be used in the exemplary embodiments shown in any of the other figures of the disclosure.

Wafer scale replication techniques are mentioned here as an example only. This technique complies with existing techniques for the mass manufacture of camera lenses and so represents an economical method. However it is to be appreciated that any suitable alternative manufacturing method can be used, and different assembly techniques can be used. For example, each of the optical layers may be fabricated on different wafers, optionally at different times, and put together on an assembly line; or the lens can be formed on the sensor structure, adding each layer on top of the previous.

It will be appreciated that the above exemplary embodiments are not an exhaustive list of the possible physical structures that can be provided to implement the disclosure. Variations are envisaged. For example, it is not essential to have a one-to-one lenslet to focusing lens arrangement such as is illustrated in the exemplary embodiment of FIG. 3. One focusing lens could serve a plurality of lenslets, for example a 2×2 or larger array, or vice versa. The figures are also schematic in nature, and omit various support structures, for the purposes of clarity of illustration.

It is also to be appreciated that the specific curvature of the lenslets shown in the figures is for illustration purposes only, and in particular has been somewhat exaggerated. The actual choice of shape for the optical wedges will depend on the required criteria for the field of view (FOV) divergence, and will be discussed in more detail below. Furthermore, a number of optical wedges having the same shape can be provided in the array, rather than there always being a unique lenslet shape for each different channel.

The sensor array 104 comprises an array of radiation sensitive pixels formed on or in a semiconductor substrate. As is well known, the pixels themselves may optionally be provided with microlenses. In the field of image sensing devices, a microlens is a small lens formed over a pixel, usually formed from transparent photoresist that functions to concentrate incident radiation towards a radiation sensitive portion of the pixel, usually its center. The microlenses have a characteristic dimension (diameter) that is one, or many more (up to, say, six or seven), orders of magnitude less than the size of the lenslets 102 of the objective optical element 100. Furthermore, the microlenses are formed as one of the manufacturing steps in the formation of the pixel array itself, and are thus thought of as being "part of" the pixel array. They are a design feature of the pixel array that serves to maximize the fill factor of the pixels in the array, rather than being part of the optical element used as an imaging objective.

Figure 5:
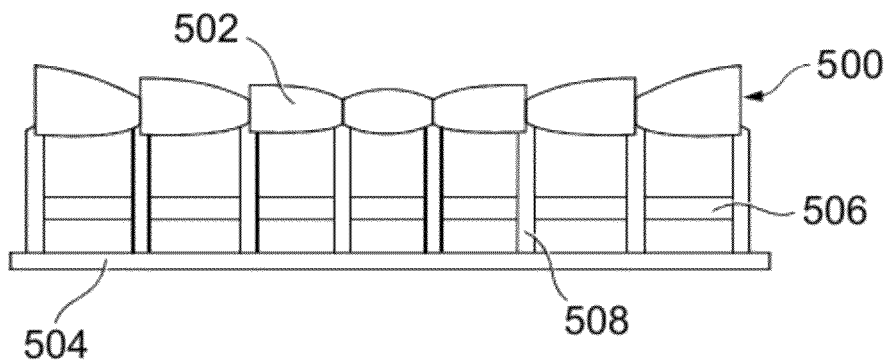
FIG. 5 shows an imaging device including some optional additional features, including a layer that may include a color filter array and/or other focussing optics, and optical isolators such as opaque baffles or other equivalents.

The imaging devices formed according to the exemplary embodiments described above may also include further features, illustrated generally in FIG. 5, which shows an objective optical element 500 comprising a lenslet array formed of individual lenslets 502. The objective optical element may be of the type illustrated in any of the exemplary embodiments mentioned herein.

These features include a layer 506 that may include a color filter array and/or other focussing optics, and optical isolators 508 such as opaque baffles or other equivalents.

The optical isolators are provided to optically isolate the respective channels. In the exemplary embodiment of FIG. 5, the optical isolators 508 are formed as opaque baffles which are provided between adjacent pixel sub-arrays and can extend from the surface of the sensor array 504 to the underside surface of the lenslet array 500. The areas of the sensor array 504 on which the opaque baffles 508 are formed can advantageously be areas which are not sensitive to radiation, such as metallization or readout components of the pixel array. The opaque baffles 508 serve to reduce or prevent cross-talk between sub-images and channels and to suppress image formation outside the designated pixel sub-array that provides image data for the channel for each respective sub-image, and can also play a part in controlling the field of view of the sub-images.

The side walls of the baffles may be corrugated in order to reflect back more of the off-axis incident stray light as compared with the case of a straight-walled baffle.

As an alternative or an addition to baffles, one or more field stops may be provided in order to reduce or prevent cross-talk between sub-images and channels and to suppress image formation outside the designated pixel sub-array that provides image data for the channel for each respective sub-image, and can also play a part in controlling the field of view of the sub-images.

Optical isolators can also be provided to reduce stray light incident on the pixel array as a whole. These isolators can also take the form of opaque baffles (which may optionally be corrugated) and/or field stops.

Figure 6:
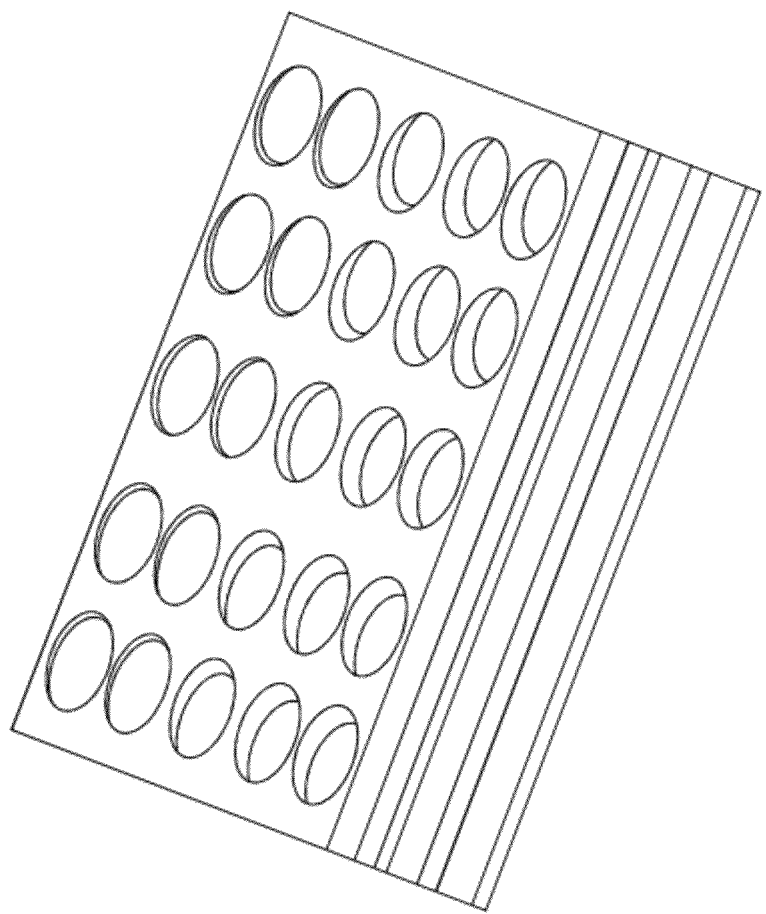
FIG. 6 shows a perspective view of a wafer scale replicated structure.
Figure 7:
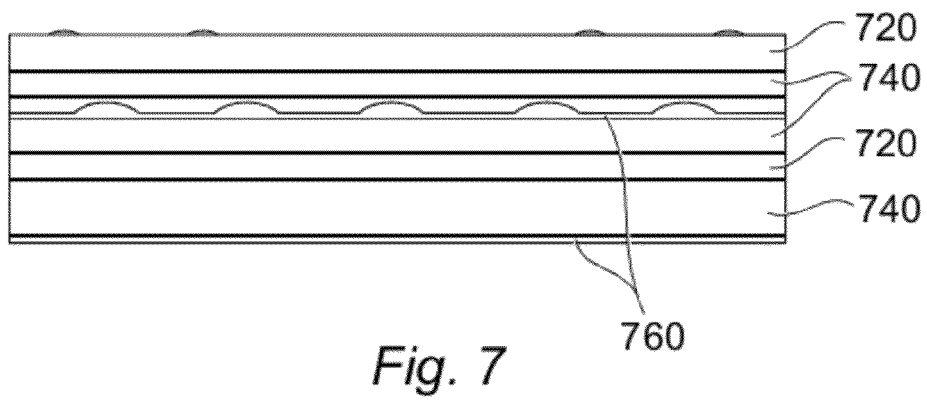
FIG. 7 shows a cross-section of the structure of FIG. 6.

FIGS. 6 and 7 show an exemplary structure manufactured according to a wafer scale replication manufacturing method, as mentioned above. FIG. 6 shows a perspective view of the structure, while FIG. 7 shows a cross section, showing an embodiment comprising baffles 720, glass substrates 740 and field stops 760. With this type of method, the optical isolators do not extend into the substrate.

The sensor array 104 can be manufactured according to any desired specification and will in itself be similar to other sensor arrays known in the art. However, each lenslet 102 and corresponding pixel sub-array forms a single channel. The radiation intensity that is read out from each pixel sub-array comprises data corresponding to each channel, also referred to as a "sub-image".

In one embodiment a single lenslet 102 can be provided for each pixel in the sensor array 104. However, it will be appreciated that this will be relatively rare and it be more common for each channel to comprise a plurality of pixels. For example, a pixel array of between one million and ten million pixels could be divided into nine, sixteen, twenty-five or thirty-six channels. It will be appreciated that these numbers are in no way limiting on the scope of the invention, and are provided for illustration only. The number of channels does not have to be a square number, and the physical size of each channel does not have to be the same. Any arbitrary arrangement of channels would be possible.

The field of view (FOV) of a particular channel can be characterized by the optics, that is, by the shape of the individual lenslets 102 in the lenslet array 100, and by their rotational position. It is possible for two lenslets 102 to be formed having the same basic shape, but to provide for different optical effects by being positioned at different rotational positions about a z-axis that runs perpendicular to the image plane and through the centers of the lenslets, or about x and y axes parallel to the image plane.

This relationship is illustrated in FIGS. 8-11.

We consider an image sensing system with a given field of view (FOV), divided into N by N individual channels each with an individual field of view (IFOV). The FOV and IFOV have dimensions angle, centered about the common or individual optical axis respectively. As the distance to an observed object increases, so too does the size of the projection of an FOV onto that object. The FOV or IFOV for a given sensor location and orientation is characterized by the projection of the given sensor location through the optics into object space. This is equivalent to the radiation from a given region of object space that is focused onto the sensor location.

N can be any integer number, and so the size of the maximum diameter of each lenslet afforded by the entire size of the system is D.

$$D = \frac{X_{system}}{N}$$

where $X_{system}$ is the size of the system in one dimension.

Figure 8:
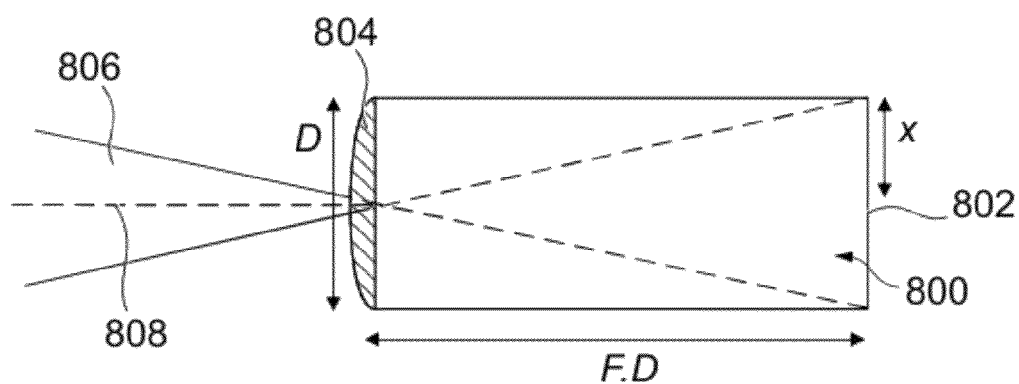
FIGS. 8-11 illustrate how the shape of lenslets within the array influences the resulting field of view.

FIG. 8 shows a representation of the image sensor system 800, with the image plane 802 being oriented along the right hand side vertical axis of the Figure, and the objective element 804 represented, which in this example functions as a standard convex lens. The dimension x, being the half image width as shown in the Figure, can be derived as:

$$x = F \tan\left(\frac{IFOV}{2}\right) \cdot D$$

where D is the aperture diameter, F is the lower limit of F-number, and F.D is the effective focal length. The FOV 806 is centered around the optical axis 808 of the system.

Given D=2x, we rewrite the relationship to give the F-number that accommodates the IFOV within the diameter of the aperture:

$$F = \frac{1}{2 \cdot \tan\left(\frac{IFOV}{2}\right)}$$

The actual physical focal length of the system is defined as F*D.

Figure 9:
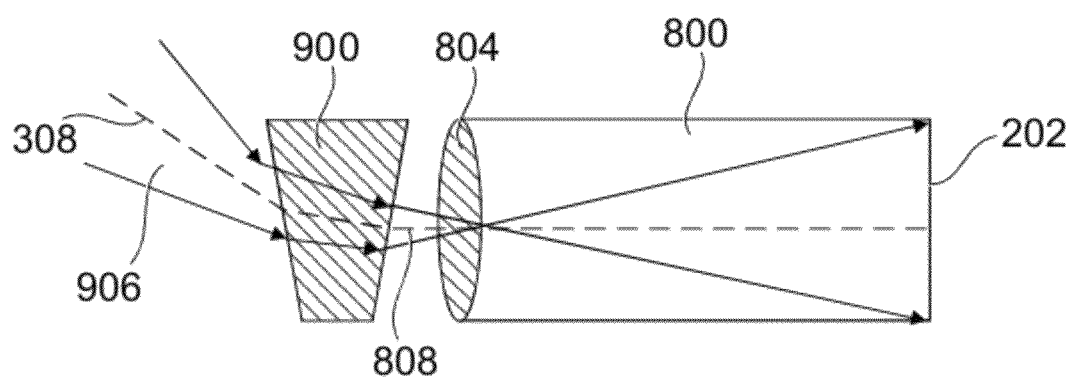

To achieve a different IFOV for each channel, an optical element is required in order to redistribute the incident radiation, such as an optical wedge, which is illustrated in FIG. 9. Here, a wedge 900 is provided in front of the system 800 shown in FIG. 8. The optical axis 808 of the system 800 is modified by the wedge to define a new IFOV 906, centered around a redistributed optical axis 908.

Figure 10:
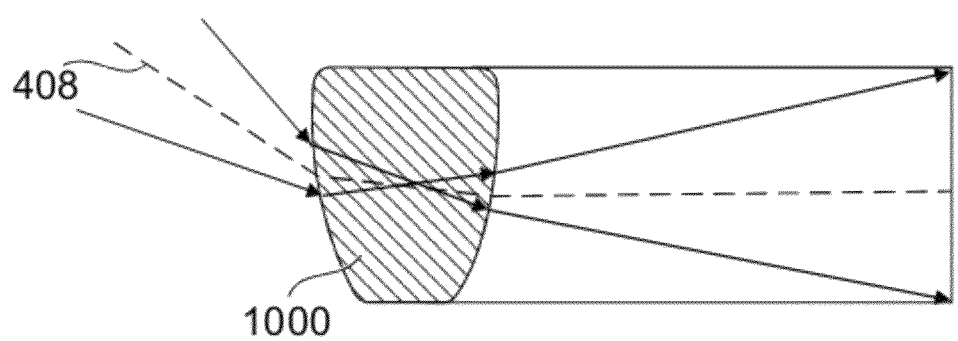

The wedge 900 in combination with the convex lens 804 as shown in FIG. 9 can be replaced by a single optical element 1000, shown in FIG. 10. The optical element 1000 can be treated as a wedged lens, where the tilt of the lens faces are the same as the wedge tilts as shown in FIG. 9. That is, a lenslet design for achieving a given redistribution of a channel's IFOV can be arrived at by investigating the properties of a wedge.

Figure 11:
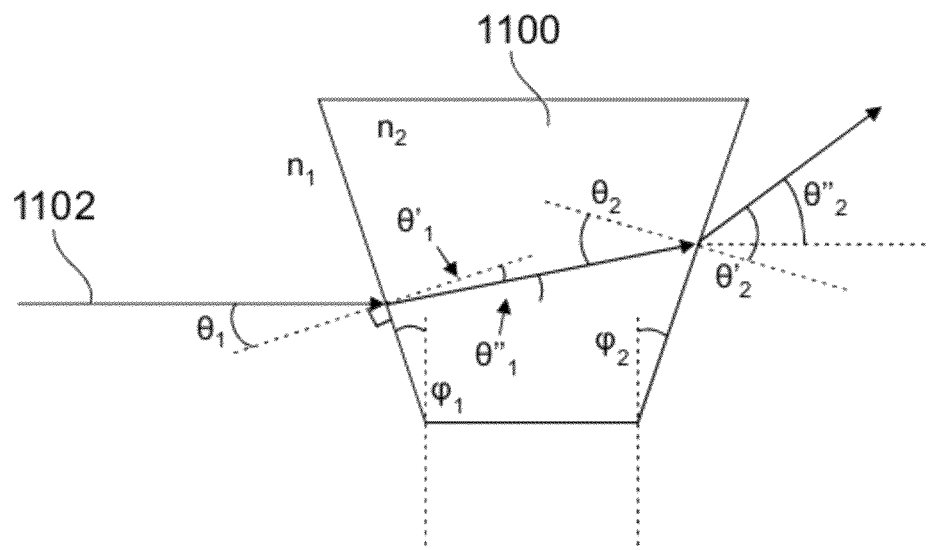

Working from the image back out to object space we construct a model such as that shown in FIG. 11. The wedge 1100 is designed to change the angle of an incident radiation 1102 by an amount $\theta''_2$ through the differing refractive indices n1, n2 of the atmosphere (usually air) and the wedge respectively.

The exit angle $\theta''_2$ is the angle of orientation of the channel's IFOV (the dotted line in FIGS. 9 and 10), and the side wall angles of the wedge are defined by $\phi_1$ and $\phi_2$.

The solution is non-analytical, that is, there is no one solution so the design can be formulated numerically and optimized. The relationship is given as:

$$\sin(\theta''_2) = \frac{n_2}{n_1} \cdot \sin\left\{\varphi_1 - \sin^{-1}\left(\frac{n_1}{n_2} \cdot \sin\varphi_1\right) + \varphi_2\right\} - \sin(\varphi_2)$$

The wedge 900 or optical element 1000 may be achromatized to minimize dispersion of electromagnetic radiation across the image. Achromatization of the element and/or wedge is achieved by constructing the element with a plurality of materials. Each material may have different optical properties to minimize optical dispersion introduced by wedged optical elements.

For an N×N system with a given FOV, the exit angle of channel n, $\theta''_n$, in the x-dimension is defined as $$\theta''_n = n \cdot \frac{FOV}{2} \cdot \frac{2}{N} = n \cdot \frac{FOV}{N}$$

where $$n = 0, 1, 2 \ldots \frac{N}{2}$$

n is the channel number as measured from the array center.

The corresponding angles for the y-dimension can be found using a similar formula.

This means that the desired IFOV for each channel can be determined by the choice of lenslet face tilt $\phi_1$ and $\phi_2$ for each lenslet 102. Different lenslet face tilts can be chosen to define different fields of view across the lenslet array, to provide a desired angular distribution of channels' IFOVs.

As well as the shape and rotational position of the lenslets, the choice of material will also influence the optical behavior of the channel and thus the field of view. Different materials will have different refractive indices, the values of which can be taken into account in the use of the equations above. Also, the optical elements shown in FIGS. 8-11 are shown as having a uniform refractive index throughout, though it will be appreciated that optical elements having spatially varying refractive indices may be employed if desired. The equations and diagrams shown above can be modified appropriately, as will be apparent to a person skilled in the art.

In a preferred embodiment of this disclosure, adjacent channels have individual fields of view that intentionally overlap, preferably such that, up until an application defined object distance, the IFOVs of adjacent-but-one channels are non-overlapping. That is, the IFOVs of adjacent-but-one channels only overlap at the extremities of the IFOVs, i.e. at the application defined object distance. This is for example shown in FIG. 12. The system field of view is the overall distribution of the individual channels' fields of view (IFOVs). The lenslet array 1200 is shown provided above an image sensor array 1204. The optional opaque baffles and other elements illustrated in FIG. 5 are omitted for ease of illustration. The individual field of view for each channel is shown for each lenslet 1202.

The application defined object distance is a desired distance from the outer surface of the lenslet array, for the imaging of a given object, at which the object is deemed to be in focus.

In one embodiment, the focus of the camera may be adjusted, for example by varying the distance between the objective optical element and the radiation sensitive surface of the image sensor. Determination of an object as being "in focus" can be made manually by inspection of or through a viewfinder and inspecting how the imaged scene changes as the distance between the objective optical element and the radiation sensitive surface of the image sensor is changed, or automatically in an autofocus procedure where image data is analyzed to determine a distance between the objective optical element and the radiation sensitive surface of the image sensor that corresponds to a maximum sharpness, for example by employing edge detection techniques and measuring optical modulation transfer function (MTF) or similar metrics to determine the sharpness of edges within the detected image.

In another embodiment, a camera system may be a fixed-focus system, where variation of the distance between the objective optical element and the radiation sensitive surface of the image sensor cannot be achieved. In a fixed-focus embodiment, the "application defined object distance" for which the IFOVs of adjacent-but-one channels are non-overlapping, is a fixed value. This is chosen as part of the design of the camera system, and the particular value chosen will depend on the intended use of the camera system. For typical consumer applications, where for example the fixed focus camera might be part of a low cost webcam or incorporated into a cheaper mobile telephone, a typical value might be 20 cm. For fixed focus cameras, this distance may also correspond to the hyperfocal distance, that is, the depth of field is essentially designed to be from the application defined object distance to infinity.

The determination of an object as being in-focus depends on the depth of field of the lenslet sensor-subdivision camera system, which will depend on the focal length and F-number of the objective optical element. In some camera systems it is possible to vary the F-number by varying the size of an aperture over the objective optical element or image sensing array.

The overlap between fields of view can be chosen based on F-number limitation and color sampling requirements. The F-number of an optical system is defined as the effective focal length divided by the diameter of an entrance pupil. If a limit was to be imposed on the individual field of view of a channel so that it does not overlap at all with adjacent individual fields of view, the result is a large F-number system which means that the z-height of the camera must be relatively large. Conversely, if the F-number of each channel is limited to a small value, for example a value of less than two, the wider field of view means that a given area of object space is resolved on a relatively smaller area of pixels and so the pixel array cannot sample the image space fully even considering the overlap between the individual fields of view and subsequent image multiplexing.

The balance is therefore an F-number that provides an overlap between adjacent individual fields of view with an optical resolution that is resolvable by the multiple sampling of the adjacent channels. The chosen F-number must also be large enough so that, at the application defined object distance, overlap of fields of view only occurs between adjacent individual fields of view. This reduces the effects of parallax, as will now be discussed.

The magnitude of parallax between channels is represented by the results of the following relationships $Err1=(\phi_2+\theta_2)-(\phi_1+\theta_1)$ and $Err2=(\phi_2-\theta_2)-(\phi_1-\theta_1)$, where $\phi_1$, $\phi_2$, $\theta_1$ and $\theta_2$ are the angles defined in FIG. 7

Parallax gives rise to two immediate problems for a multi-channeled imaging device. The first is the object offset between images. That is, the apparent position of an object will be different for different channels.

Figure 13:
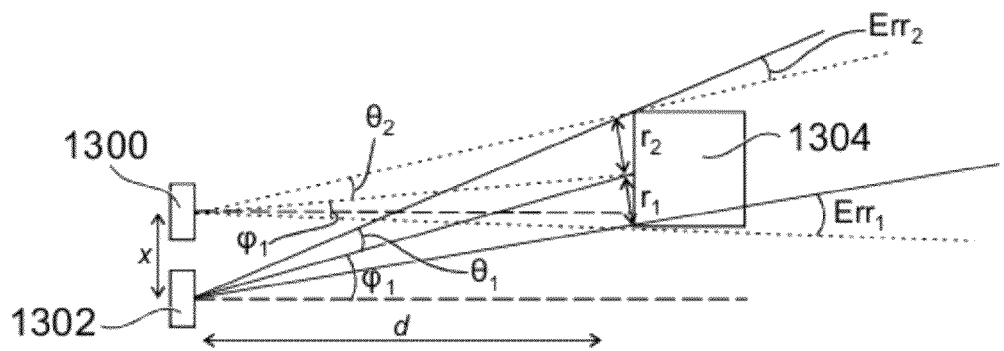
FIG. 13 illustrates parallax error as the result of near field photography with a camera imaging with independent color channels.

FIG. 13 shows the parallax error as the result of near field photography in the case of a camera imaging with two separate channels, represented by pixel sub-arrays 1300, 1302 (the other elements are omitted for clarity of illustration). The channels 1300, 1302 are separated by a distance, x, and may be sensitive to different colors, for example red and green. The Figure illustrates how each channel has a different view of the object 1304. Region $Err_1$ represents a portion of object space for which the first channel 1300 will detect the presence of an object but for which the second channel 1302 will not, while region $Err_2$ represents a portion of object space for which the first channel 1300 will not detect the presence of an object but for which the second channel 1302 will.

The difference in apparent position of an object between channels varies with the distance from the objective optical element. This variation can cause a problem when reconstructing images (that is, combining the "sub-images" to form the overall image) as the registration points for a specific object will be different in different channels' sub-images.

The second problem is the occlusion of regions of object space from one channel with respect to another. For example, one channel may record the presence of two objects in close proximity, however one object may be partially or completely hidden from the view of another channel.

Figure 14:
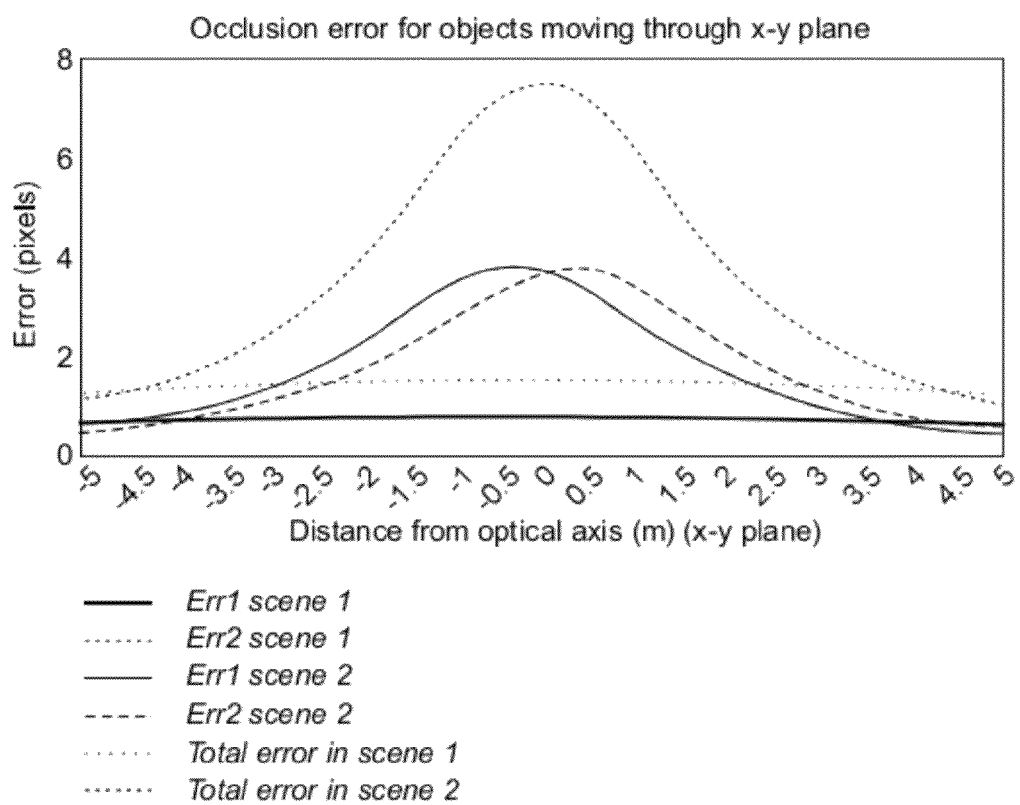
FIG. 14 illustrates parallax error.

The behavior of parallax error is graphically represented in FIG. 14, which shows the behavior of the magnitude of parallax error in pixels as defined by FIG. 13 and the error relationships. The parameters and results are tabulated in TABLE 1 below which describes the system behavior when imaging two common photographic subjects.

| Scenario | Channel separation | Pixel pitch | Object distance | Object radius | Maximum error on edge | Total error |
|---|---|---|---|---|---|---|
| Leaf @ 10 m (scene1) | 6.7 mm | 2 μm | 10 m | 0.05 m | >1 pixel | ~2 pixels |
| Portrait@ 2 m (scene 2) | 6.7 mm | 2 μm | 2 m | 0.3 m | ~4 pixels | >7 pixels |

The magnitude of parallax between channels is proportional to the distance between the channels, the distance to the objects and the size of the objects. The suppression of the parallax error can therefore only be achieved by reducing the channel separation distance, because both object distance and aspect are variable.

The magnitude of parallax is significant between two channels separated by a common sensor array width. However, it will generally be undesirable or indeed impossible to reduce this dimension and so it follows that channels separated by a significant distance should not be permitted to observe the same region of object space. An extension of this argument is to only permit adjacent channels to observe the same region of object space until the application defined object distance, from which point the next but one channel is allowed to overlap, thus ensuring minimal detriment to the image quality.

As mentioned above, it is possible to customize the application defined object distance for a fixed focus camera module. By defining the number of channels N and the overall FOV, we calculate the IFOV as $$IFOV = \frac{2}{N-1} \cdot FOV$$

By defining the preferable application defined object distance d, we then calculate the suitable angular separation between adjacent channel optical axes, ΔIFOV as $$\Delta IFOV = \frac{IFOV}{2} + \tan^{-1}\left(\frac{x}{d}\right)$$

If the desired overlap of sub-images is half of the equivalent linear IFOV in object space then the focus length of the per channel objective lens is half that of the objective required for the required overall FOV when only one channel exists.

Figure 15:
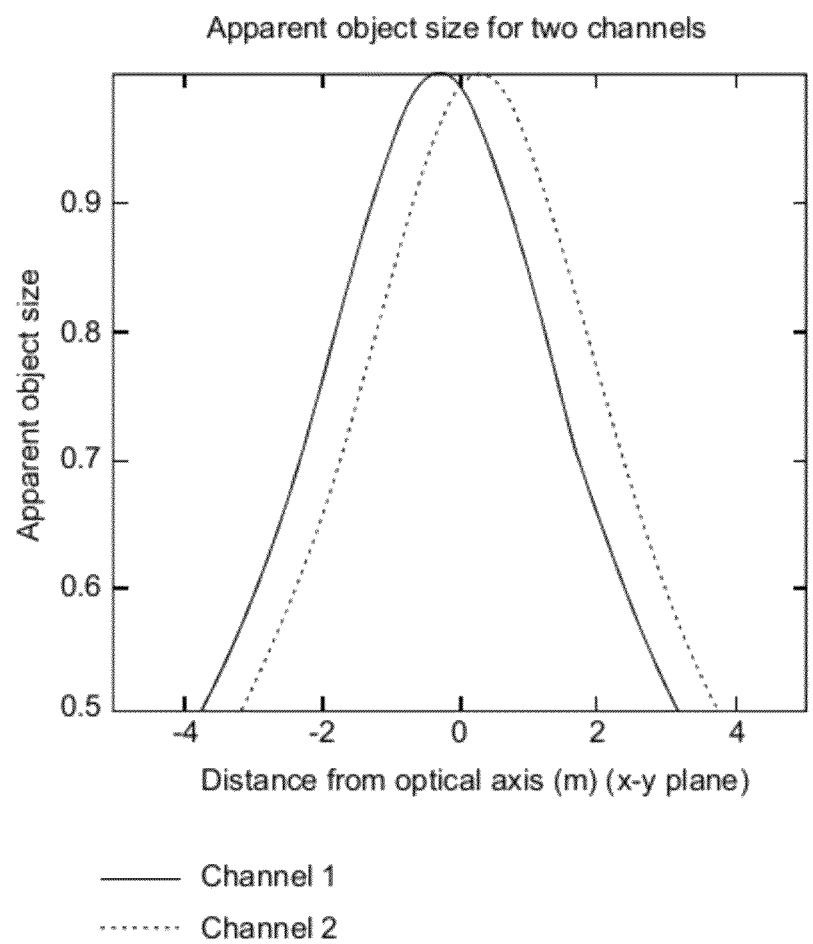
FIG. 15 illustrates the variation of apparent object sizes with the distance from an optical axis for two channels.

Another consideration for parallax is the relative object size as viewed by each channel. Differing object sizes again need to be taken account of during image reconstruction. A reasonable simulation shows that this difference is greater than two pixels for channel separations of the order of the digital sensor width. This behavior acts as a further impetus for the reduction of the separation between channels that view the same region of object space. This is shown in FIG. 15, which illustrates an example variation in apparent object size (in arbitrary units) as an object moves across the field of view of the imaging device. This illustration is for the object imaged in "scene 2" as mentioned in Table 1 above.

In a preferred embodiment only a channel and its eight nearest neighbors observe the same region of object space. The IFOVs are characterized in such a way that at a desired distance, the "application defined distance", the IFOVs of adjacent-but-one channel's coincide at their extremity.

Figure 12:
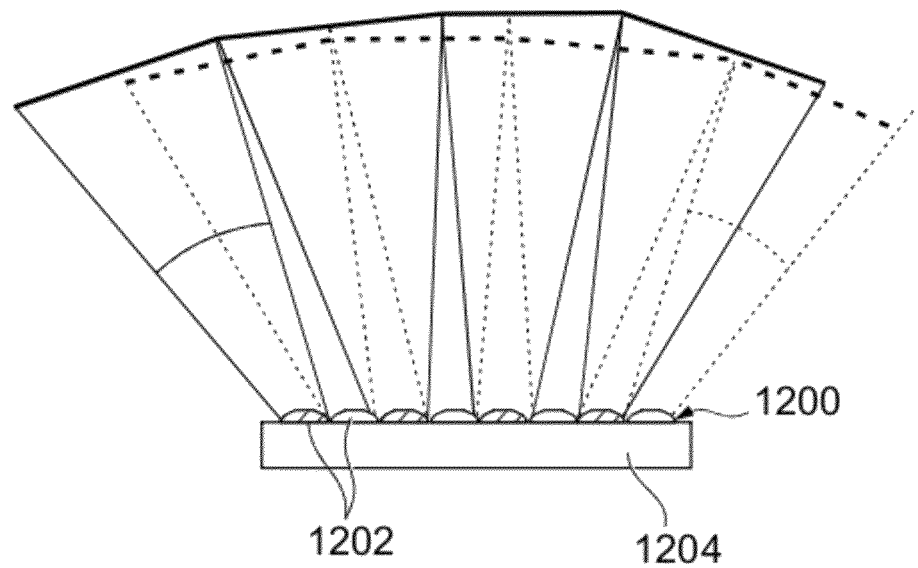
FIG. 12 illustrates the distribution and overlap of channels' fields of view in one dimension.

In a preferred embodiment, the IFOVs are angularly distributed across the array. This is also shown in FIG. 12, showing an arrangement where the IFOVs are fanned out, the central IFOVs having a central axis perpendicular to the plane of the array and the underlying image sensor, and with the IFOVs on each side of the central IFOV being angled away from the perpendicular by an increasing amount towards the extremities of the array. The angular distribution of the IFOVs increases the FOV of the overall camera system, as compared with a case where the IFOVs all have a central axis perpendicular to the array.

The novel arrangements of this disclosure lend themselves to various different color sampling techniques. Color sampling may be applied either at the pixel level or at the channel level.

Applying a color sampling at the pixel level typically involves providing a color filter array (CFA) on or over the pixel array. The color filter array comprises different portions that are designed to transmit light in different color bands. These portions are arranged in a particular pattern, typically a repeating square grid across the pixel array. Typically each pixel or group of pixels will be overlaid with CFA material that transmits radiation within a specific band, for example that of a specific color, and so as a shorthand that band is referred to as being a designation for that pixel. For example, a pixel that is overlaid with a portion of CFA that transmits light in the red portion of the visible spectrum is referred to as a "red" pixel. It is also possible to provide stacked photodiodes that yield a composite color readout for each photosite.

Applying a color sampling at the channel level can be achieved either by modifying the lenslet array, or by choosing a particular CFA arrangement for the underlying pixel sub-array. The lenslet array could be modified by providing a color filter array on the top or bottom surface of the lenslet array, or alternatively, forming the individual lenslets of different materials across the array to provide different transmission characteristics. In either case, each lenslet will transmit and each channel will record radiation within a specific band, for example that of a specific color, and so as a shorthand that band is referred to as being a designation for that channel.

Alternatively, a CFA can be applied at the pixel level, but the different color sensitivities can be unique to neighboring pixel sub-arrays corresponding to each channel, rather than to neighboring individual pixels.

In either case, a channel that is sensitive to light in the red portion of the visible spectrum is referred to as a "red" channel. The color sensitivity of neighboring channels forms a particular pattern, typically a repeating square grid across the lenslet array.

It is also to be appreciated that a channel may color sample more than one color, for example, by a CFA being applied to the pixel sub-array of each channel having a pattern comprising multiple colors.

Figure 16:
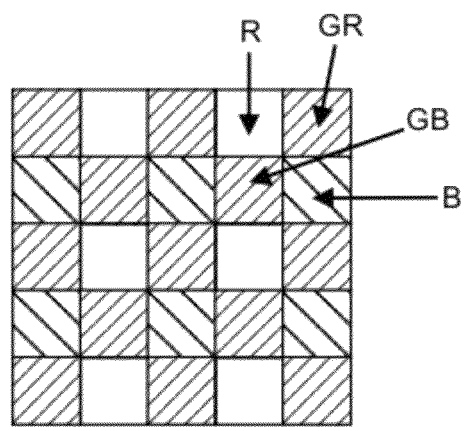
FIG. 16 illustrates the Bayer color sampling pattern.

According to one embodiment color sampling can be carried out according to the well known Bayer color pattern, as shown in FIG. 16. This pattern can be applied either at the pixel level or at the channel level, as discussed above. In this arrangement red (R), green (G) and blue (B) color sampling is carried out in a repeating square matrix. Green signals are sampled twice as frequently as the red and blue signals, in order to mimic the response of the human eye (the notation "GR" in the Figure refers to a green pixel in a row that comprises red and green pixels and no blue pixels, and "GB" refers to a green pixel in a row that comprises blue and green pixels and no red pixels). Because the green signal is sampled more often, there is less color aliasing in the green signals, meaning that the green signals can be used as a primary information source in image spatial filtering.

It will be appreciated that the pattern shown in FIG. 16 can be replicated for different, non-RGB, color schemes, and that the double sampling of one particular color is not essential. Other example color schemes include cyan, yellow, green, magenta (CYGM), red, green, blue, emerald (RGBE) and red, green, blue, infrared (RGB IR).

Figure 17:
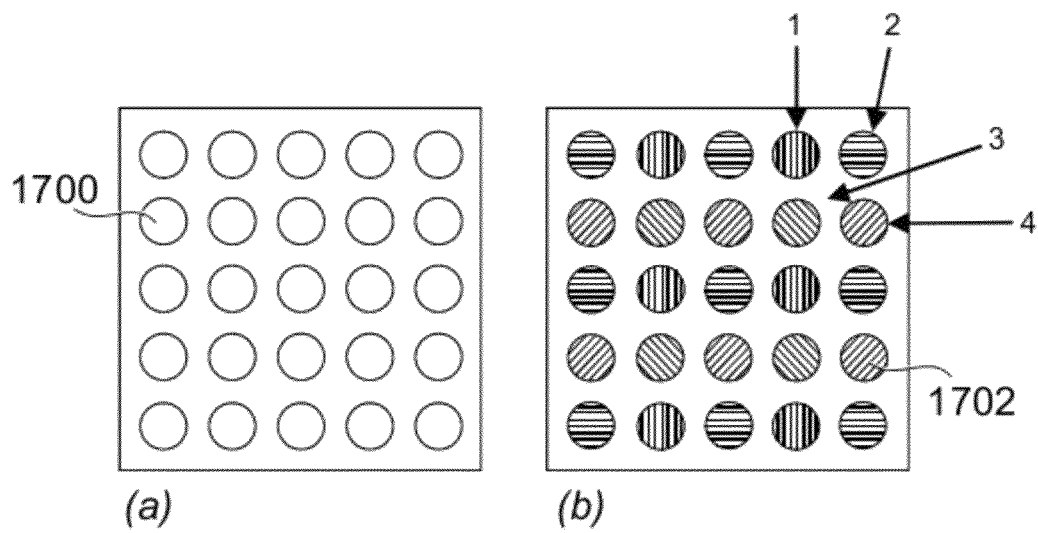
FIG. 17 illustrates different color sampling arrangements that may be implemented for an array of lenslets.
Figures 18, 19:
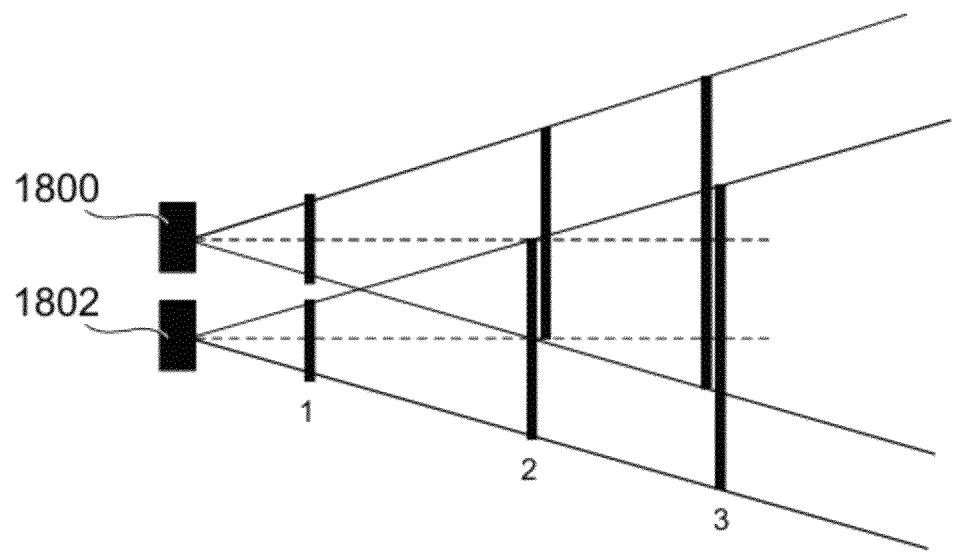
FIG. 18 shows the overlapping of adjacent channels' fields of view at various positions in object space.
FIG. 19 shows how four color channels may overlap in a common region to fully sample this common region.

FIG. 17 illustrates some possible lenslet arrangements. FIG. 17a shows a lenslet array which has no color filtering, while FIG. 17b shows an alternative embodiment where the channels are color sampled in a four-color space, each of the four different colors being represented by the four different hatching directions shown in the Figure. As mentioned above, it is possible in a preferred embodiment for each channel's individual field of view to be overlapped by eight nearest neighbors only, at an application defined object distance. In that case, the individual field of view of one channel is fully color sampled by the fields of view of the surrounding eight nearest neighbors. This is illustrated in FIGS. 18 and 19. FIG. 18 shows the overlapping of adjacent fields of view (of channels 1800, 1802) at various positions in object space, position 1 corresponding the near field, position 2 corresponding to an application defined object distance, and position 3 being an arbitrary point beyond the application defined object distance, showing how the overlap increases towards infinity. Meanwhile FIG. 19 shows how four color channels may overlap in a common region to fully sample this common region, shown as the center field within the array.

Note that the lenslets 1700, 1702 illustrated in FIG. 17 are shown as having a circular form, however it is to be appreciated that they may have a square, rectangular or other arbitrary shaped form.

Figure 20:
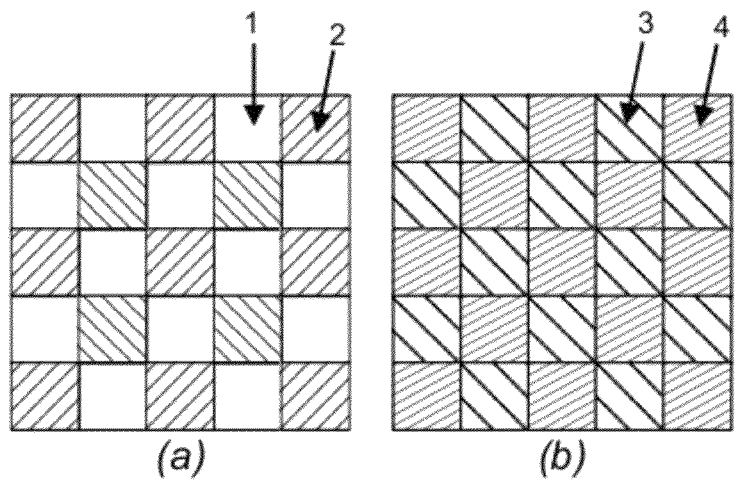
FIG. 20 illustrates a color sampling technique that samples two colors per channel.

In an alternative embodiment each channel can in fact sample more than one color. In this case, neighboring channels can still sample different color spaces, however the color composition of neighboring channels can be different. An example of such an arrangement is shown in FIG. 20, which illustrates pixel-level CFAs applied to neighboring pixel sub-arrays of neighboring channels, and wherein each channel samples two colors. Channel A in the Figure samples colors 1 and 2, while channel B in the Figure samples colors 3 and 4. The different channels A and B can themselves be arranged in a square matrix across the lenslet array similar to the arrangement of colors 1 and 2 in channel A.

In this embodiment, colors 1, 2, 3 and 4 are all different, however it will be appreciated that colors may be shared between neighboring channels, so long as the color composition or the array layout is different between different channels.

Figure 21:
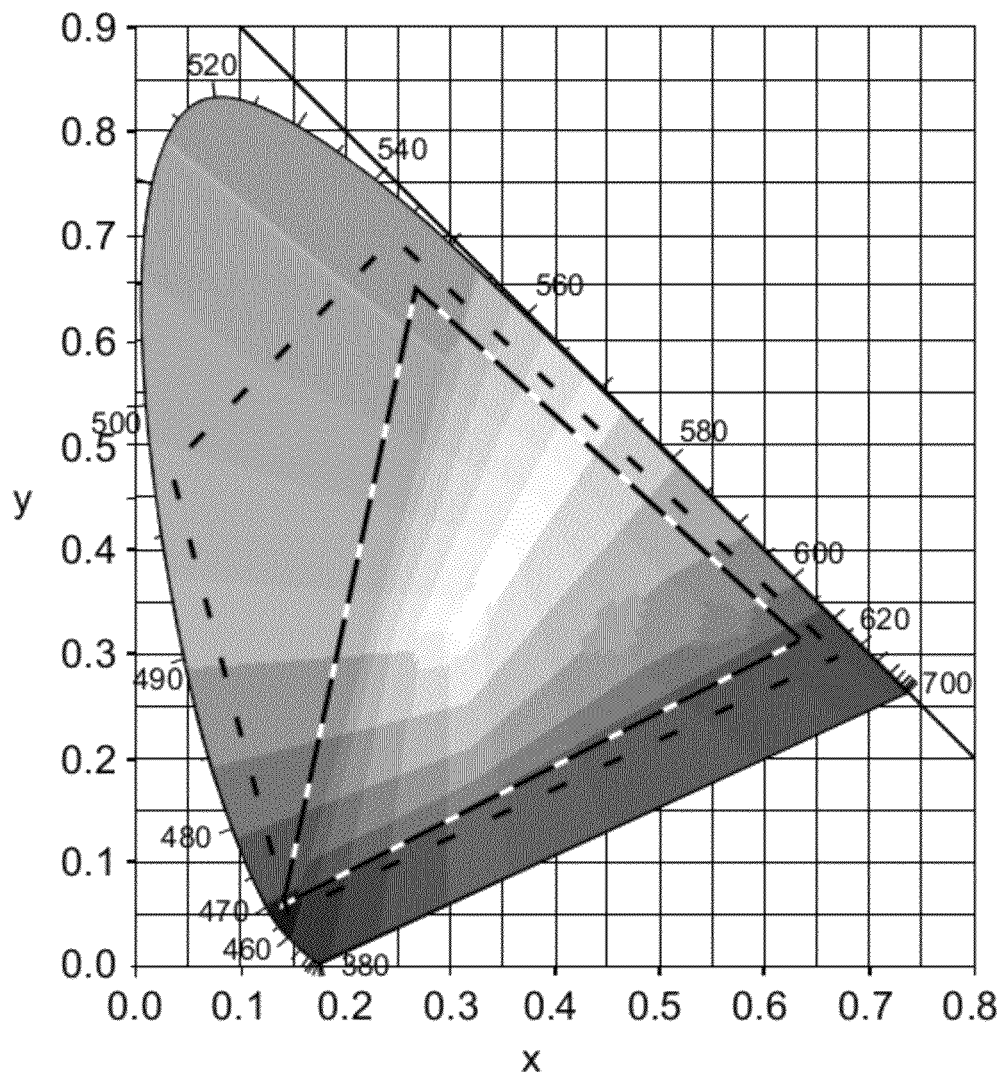
FIG. 21 is a chromaticity diagram demonstrating the increased color space that can be obtained by a four-color space compared with a three-color space.

In order to reproduce real-world colors for presentation to a user, a color space requires a minimum of 3 colors to be defined. It is then possible to reconstruct any color within that space using a weighted sum of the colors defining the space. In the presence of a fourth channel a degree of freedom exists which may be applied to extend the color sampling space by defining a fourth color band. In one embodiment, the fourth color may be a visible color, used to expand the color space of the sensor. A larger color space will result in a greater contrast ratio between colors when converted back to RGB for digital display. FIG. 21 is a chromaticity diagram, which is a modified version of the diagram that can be found in '*Color Vision and Colorimetry: Theory and Applications*' (Malacara, D. SPIE Press, 2002, ISBN 0-8194-4228-0100). The modification to the diagram shows how an RGB color space can effectively be expanded by introducing a fourth color coordinate. The specific values shown in the Figure are arbitrarily chosen for the purposes of the illustration.

In an alternative embodiment the fourth color may comprise an infrared (IR) channel characterized by a band pass filter in the infrared range. Because a CMOS/CCD sensor response is strong in the infrared this property has a number of practical uses. An image taken by an RGB filter arrangement may in fact have a strong infrared component in the reading, or the filters used may leak at these wavelengths. Knowing the infrared content of a scene by measurement through an infrared channel will allow accurate white balance estimation for the visible colors, through the calculation of an IR to color channel signal ratio.

The camera may also have no bandpass filters in the fourth color. This embodiment would also be very useful in dim light environments as a broadened sensitivity in the wavelength domain requires less time to integrate the number of photons required for a reasonable signal to noise ratio therefore reducing exposure times. Such a system could be provided with an IR light source as a scene illuminator.

Now, a digital pixel array with individual pixel color sampling is subject to the phenomenon of color aliasing. As the separation of red pixels is greater than a single pixel pitch (width), the red portion of the image is under-sampled and therefore aliased. This is also the case with the blue and green portions of the image, however in a three color pattern such as the Bayer pattern, where one color (in this case green) is sampled more frequently, the separation between individual green pixels is reduced and so too is the aliasing in that color.

Color aliasing will of course be avoided altogether if individual pixels are not color sampled. In the embodiment of color sampled channels rather than pixels as shown in FIG. 17b, color aliasing is not considered a problem.

Figure 22:
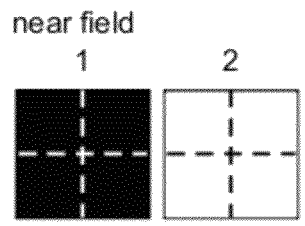
FIG. 22 illustrates the overlap of adjacent field of views in a near field and resulting excess overlap at infinity.
Figure 22:
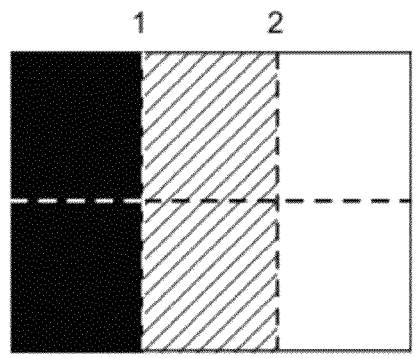
Figure 22:
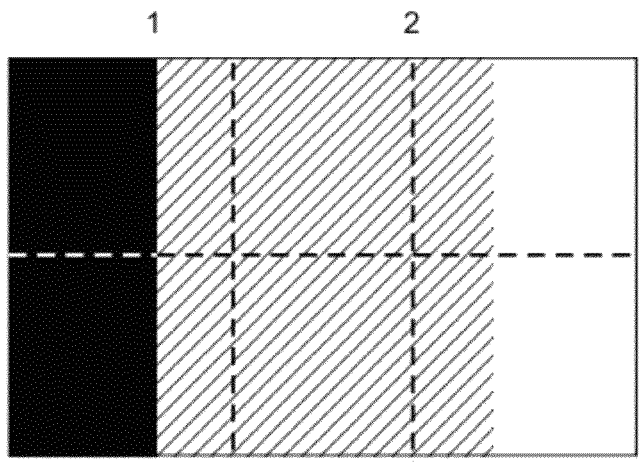
Figure 23:
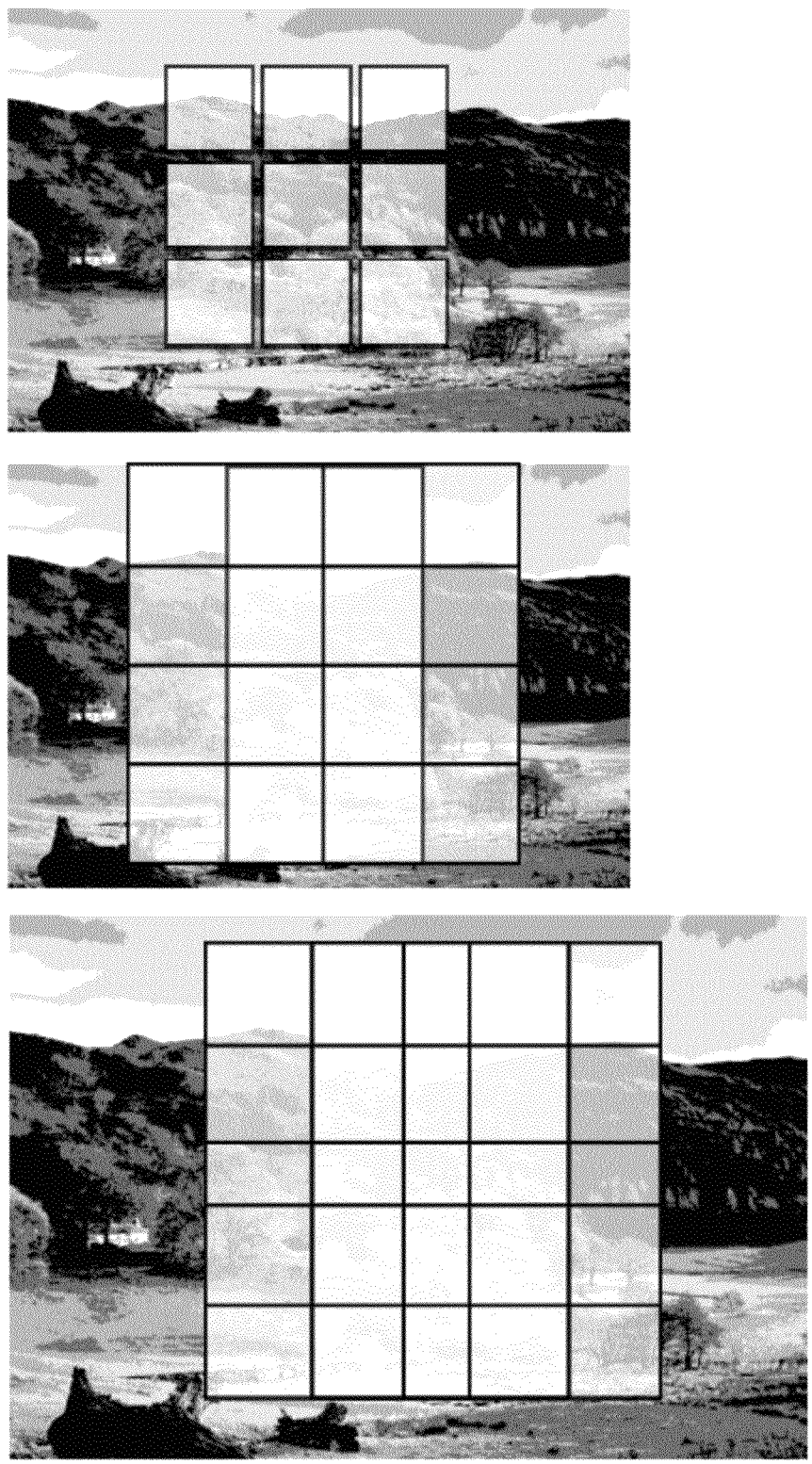
FIG. 23 illustrates the dynamic nature of the channel individual field of view overlaps at different object distances.

The data from the various sub-arrays needs to be combined together in a reconstruction step in order to form the final image. Various image registration algorithms are known in the art and may be used for the system of the present disclosure. However, the overlap of sub-images according to the disclosure provides an important aid to image registration. This is illustrated with reference to FIG. 22. The top diagram in the Figure illustrates the near field where there is no overlap of individual fields of view. The distance to the object is smaller than the application defined object distance.

The middle diagram shows the overlap of the individual fields of view at the application defined object distance. At this distance, IFOVs overlap and the adjacent-but-one channels IFOVs coincide at their extremities. That is, neighboring channels' individual fields of view converge on the center of the central channel's individual field of view when viewing an object at the ideal imaging distance.

As viewing distance increases, the next-but-one IFOVs will begin to overlap one another to a point at which the infinity overlap is reached, as illustrated in the bottom diagram.

The same concept is illustrated for a three-by-three channel array in FIG. 17, with top, middle and bottom Figures illustrating the near field, application defined object distance, and infinity overlap respectively.

The present disclosure therefore provides for an optimized image registration algorithm in which registration is dynamic, that is, taking account of the distance of the objects with respect to the application defined object distance. Alternatively, system characteristics may be defined in a calibration, using for example, prior knowledge including homographic and/or polynomial transforms that will correct for the Scheimpflug effect (projective distortion) from the lenslets and image warping due to distortion in the optics respectively and also relative illumination in each of the channels which will need to be normalized. The same registration parameters can then be applied to each image.

Figure 24:
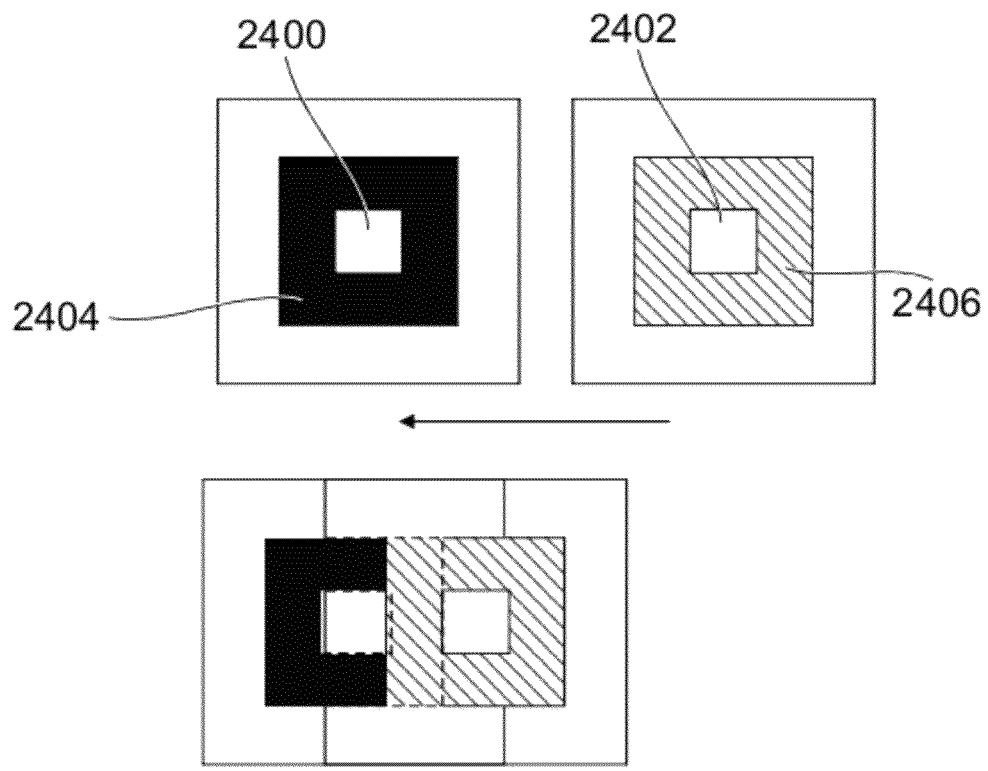
FIG. 24 illustrates a device incorporating a multi-channel image sensor type camera.

With regards to the registration of the sub-images, regions of interest (ROIs) of each sub-image will be a central portion and a margin about the edge that could in one embodiment be between 0.3 and 0.5 times the equivalent linear IFOV. The selection of ROI is due to the specification that a central region of one channel image is imaged in the neighboring eight channel images at the edges. These in turn have central regions imaged at the edge of their neighbors. The definition of ROIs reduces computing load as less data is analyzed. This is illustrated in FIG. 24. The ROIs of each channel comprise central portions 2400, 2402 and outer portions 2404, 2406. The bottom part of the Figure illustrates the overlap of the sub-images, and it can be seen that the outer portions 2404, 2406 are required to span the overlap region. It is possible to define different sized ROIs based on the size of overlap that is used to define the application defined object distance, for example, if the application defined object distance was defined as 1.5 times the IFOV rather than 0.5 times the IFOV, the ROIs would be relatively larger.

In one embodiment, image registration may be executed in the various color channels separately and the final image can then be produced by the registration of the color channels. It is also possible to register one color and relate the other colors to the calculated transform. This would be a more suitable approach if pixels are color sampled rather than the channels.

Another method disregards color and registers all color spaces together only to apply it to a three-color image in the output. The final image will be one which can be displayed on a single screen and printed as one would treat a conventional image from a camera. The user would experience minimal difference.

The present invention therefore provides a viable mechanism for providing an image sensor with reduced z-height. The image sensor according to the invention takes account of the possible errors due to parallax and color aliasing, through a new optical module, with associated image readout and reconstruction techniques and novel color sampling methods also being available.

The specific angular distribution of the channels according to this disclosure also means that an extremely wide field of view can be provided for the image sensor as a whole. Also, an extended depth of field can be achieved due to the reduced focal length of the optics and the subsequent decrease in the hyperfocal distance.

Figure 25:
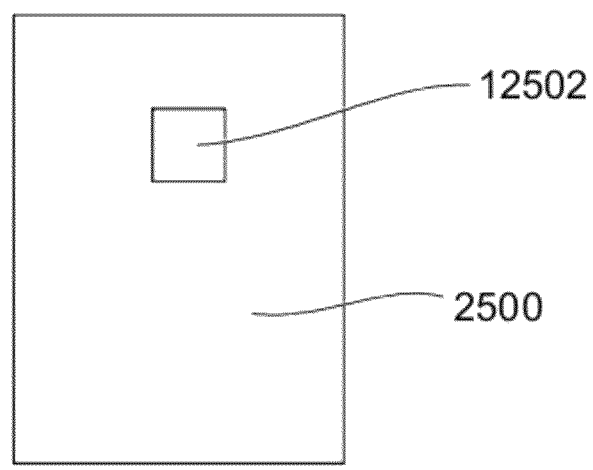
FIG. 25 illustrates the overlap of regions of interest (ROIs) of neighboring channels.

The various aspects of this disclosure may be incorporated in many devices. FIG. 25 shows a device 2500 that includes an image sensor 2502 in accordance with the disclosure, which is operable according to the methods mentioned herein. The device may be a mobile device such as a mobile telephone, or a webcam, a laptop, desktop computer, or video recorder, for example.

Various improvements and modifications may be made to the above without departing from the scope of the invention.

What is claimed is:

1. An image sensor, comprising:
   a pixel array;
   an image sensor objective optical element comprising a lenslet array; wherein:
   each lenslet directs incoming radiation onto a different specific pixel or sub-array of pixels; and
   one or both of the shape and position of the lenslets in the lenslet array are such that the fields of view of next-but-one neighboring lenslets do not overlap until a certain object distance away from the lenslet array;
   wherein the pixel array and the lenslet array are held in a fixed relation to each other along a central optical axis of the image sensor, and the hyperfocal distance of the lenslet array corresponds to the certain object distance.

2. The image sensor of claim 1, wherein the lenslet array comprises an array of convex lenses.

3. The image sensor of claim 2, wherein said convex lenses are formed as protuberances from a common substrate.

4. The image sensor of claim 1, wherein the lenslet array comprises an array of wedge shaped optical elements.

5. The image sensor of claim 1, wherein a region of object space at said certain object distance that is observed by the field of view of one lenslet is also observed at said distance only by that lenslet's eight nearest neighbor lenslets.

6. The image sensor of claim 1, wherein each lenslet comprises a wedge shaped optical element and the field of view is defined by at least one face tilt of said wedge shape.

7. The image sensor of claim 1, wherein the fields of view of the lenslets are angularly distributed across the lenslet array.

8. The image sensor of claim 1, comprising a lenslet-level electromagnetic radiation band-sampler.

9. The image sensor of claim 8, wherein said band-sampler comprises a band filter array formed on one side of the lenslet array.

10. The image sensor of claim 9, wherein said band filter array samples at least two bands, with portions of different band-selectivity being arranged in a square pattern of lenslets that repeats across the lenslet array.

11. The image sensor of claim 10, wherein said band filter array samples three bands, with two of the four portions in said square pattern of lenslets being sensitive to one of the three bands and arranged diagonally opposite each other in the pattern.

12. The image sensor of claim 10, wherein said band filter array samples four bands.

13. The image sensor of claim 8, wherein all of the bands of electromagnetic radiation that are sampled are bands of visible light.

14. The image sensor of claim 8, wherein at least one of the bands of electromagnetic radiation that are sampled is a band of infra-red radiation.

15. The image sensor of claim 1, comprising a pixel-level electromagnetic radiation band-sampler.

16. The image sensor of claim 15, wherein said electromagnetic radiation band-sampler comprises a band filter array provided over or formed on or as part of said pixel array.

17. The image sensor of claim 16, wherein said band filter array samples at least two bands, with portions of different band-selectivity being arranged in a square pattern of pixels that preferably repeats across the pixel array.

18. The image sensor of claim 17, wherein said band filter array samples three bands, with two of the four portions in said square pattern of pixels being sensitive to one of the three bands and arranged diagonally opposite each other in the pattern.

19. The image sensor of claim 17, wherein said band filter array samples four bands.

20. The image sensor of claim 15, wherein all of the bands of electromagnetic radiation that are sampled are bands of visible light.

21. The image sensor of claim 15, wherein at least one of the bands of electromagnetic radiation that are sampled is a band of infra-red radiation.

22. The image sensor of claim 15, wherein the pixel-level electromagnetic radiation band-sampler comprises a first portion for a first pixel sub-array onto which a field of view of a first lenslet is focused; and a second portion for a second pixel sub-array onto which a field of view of a second lenslet is focused; said first and second portions providing different band-sampling functions.

23. The image sensor of claim 22, wherein each of the portions of the electromagnetic radiation band-sampler comprise portions of different band-selectivity being arranged in a square pattern of pixels that preferably repeats across the pixel sub-array.

24. The image sensor of claim 22, where the portions of the pixel-level electromagnetic radiation band-sampler are arranged in a square pattern of portions that preferably repeats across the pixel array.

25. The image sensor of claim 1, comprising a processor for performing image reconstruction, that dynamically determines the overlap of sub-images according to regions of interest in sub-array images determined in order to register the images with respect to each other and to stitch them into a composite image.

26. The image sensor of claim 1, wherein the image sensor is a camera.

27. The image sensor of claim 26, wherein the camera is contained within a device selected from the group consisting of a mobile telephone, a webcam, an optical mouse, a laptop computer or a desktop computer.

28. A method of imaging a scene, comprising:
   directing incident radiation from specific regions of object space onto different specific pixels or sub-arrays of pixels;

wherein each specific region of object space is defined by the field of view of a lenslet from within a lenslet array that forms an image sensor objective optical element, wherein the lenslets in the array have one or more of a shape and position such that the fields of view of next-but-one neighboring lenslets do not overlap until a certain object distance away from the lenslet array, and wherein the the hyperfocal distance of the lenslet array corresponds to the certain object distance.

29. The method of claim 28, wherein a region of object space at said predetermined distance that is observed by the field of view of one lenslet is also observed at said distance only by that lenslet's eight nearest neighbor lenslets.

30. The method of claim 28, wherein each lenslet comprises a wedge shaped optical element and the field of view is defined by at least one face tilt of said wedge shape.

31. The method of claim 28, comprising carrying out lenslet-level electromagnetic radiation band sampling.

32. The method of claim 31, wherein said step of electromagnetic radiation band sampling comprises sampling at least two bands.

33. The method of claim 31, wherein all of the bands of electromagnetic radiation that are sampled are bands of visible light.

34. The method of claim 31, wherein at least one of the bands of electromagnetic radiation that are sampled is a band of infra-red radiation.

35. The method of claim 28, wherein the pixel array and the lenslet array are held in a fixed relation to each other along a central optical axis of the image sensor.

36. The method of claim 28, further comprising reconstructing an image by combining image data from each of the pixel sub-arrays, wherein said reconstruction dynamically determines the overlap of data from each of the pixel sub-arrays according to regions of interest in sub-array images determined in order to register the images with respect to each other and to stitch them together.

37. An image sensor, comprising:

a pixel array including a first sub-array of adjacent pixels for a first color channel, a second sub-array of adjacent pixels for a second color channel and a third sub-array of adjacent pixels for a third color channel;

an image sensor objective optical element comprising a lenslet array; wherein:

each lenslet directs incoming radiation onto a different specific sub-array of adjacent pixels; and one or both of the shape and position of the lenslets in the lenslet array are such that fields of view of next-but-one neighboring lenslets do not overlap until reaching a hyperfocal distance of the lenslet array.

38. The image sensor of claim 37, wherein the pixel array and the lenslet array are held in a fixed relation to each other along a central optical axis of the image sensor.

39. The image sensor of claim 37, wherein the pixel array and the lenslet array are movable in relation to each other along a central optical axis of the image sensor.

* * * * *